United States Patent
Berg et al.

(10) Patent No.: US 11,670,293 B2
(45) Date of Patent: Jun. 6, 2023

(54) ARBITRATING BETWEEN MULTIPLE POTENTIALLY-RESPONSIVE ELECTRONIC DEVICES

(71) Applicant: Google LLC, Mountain View, CA (US)

(72) Inventors: Garrett Frederick Berg, Arvada, CO (US); Zac Livingston, Boulder, CO (US)

(73) Assignee: GOOGLE LLC, Mountain View, CA (US)

( * ) Notice: Subject to any disclaimer, the term of this patent is extended or adjusted under 35 U.S.C. 154(b) by 150 days.

(21) Appl. No.: 16/948,085

(22) Filed: Sep. 2, 2020

(65) Prior Publication Data

US 2022/0068271 A1    Mar. 3, 2022

(51) Int. Cl.
| | | |
|---|---|---|
| *G10L 21/00* | (2013.01) | |
| *G10L 15/22* | (2006.01) | |
| *G10L 15/26* | (2006.01) | |
| *H04S 7/00* | (2006.01) | |

(52) U.S. Cl.
CPC .............. *G10L 15/22* (2013.01); *G10L 15/26* (2013.01); *H04S 7/301* (2013.01); *G10L 2015/223* (2013.01); *G10L 2015/228* (2013.01)

(58) Field of Classification Search
CPC ..... G10L 5/28; G10L 5/22; G10L 5/26; G10L 2015/223; G10L 2015/228; G10L 15/32; H04S 7/301
USPC ........................................................ 704/275
See application file for complete search history.

(56) References Cited

U.S. PATENT DOCUMENTS

| | | |
|---|---|---|
| 9,794,720 B1 | 10/2017 | Kadri |
| 2016/0217790 A1* | 7/2016 | Sharifi .................... G10L 15/32 |
| 2017/0345422 A1 | 11/2017 | Yang |
| 2019/0311720 A1 | 10/2019 | Pasko |
| 2019/0362715 A1 | 11/2019 | Aggarwal et al. |

OTHER PUBLICATIONS

European Patent Office; International Search Report and Written Opinion of Ser No. PCT/US2020/065013; 12 pages dated May 14, 2021.
Song, D. et al. "Event-Triggered Ephemeral Group Communication and Coordination Over Sound for Smart Consumer Devices." Sensors 2019, 19, 1883; doi:10.3390/s19081883 (2019); 19 pages.

* cited by examiner

*Primary Examiner* — Md S Elahee
(74) *Attorney, Agent, or Firm* — Gray Ice Higdon

(57) ABSTRACT

Techniques described herein are directed to arbitrating between multiple potentially-responsive, automated-assistant capable electronic devices to determine which should respond to the user's utterance, and/or which should defer to other electronic device(s). In various implementations, a spoken utterance of a user may be detected at a microphone of a first electronic device, a spoken utterance provided by a user. Sound(s) emitted by additional electronic device(s) may also be detected at the microphone. Each of the sound(s) may encode a timestamp corresponding to detection of the spoken utterance at a respective electronic device. Timestamp(s) may be extracted from the sound(s) and compared to a local timestamp corresponding to detection of the spoken utterance at the first electronic device. Based on the comparison, the first electronic device may either invoke an automated assistant locally or defer to one of the additional electronic devices.

20 Claims, 7 Drawing Sheets

ARBITRATING BETWEEN MULTIPLE POTENTIALLY-RESPONSIVE ELECTRONIC DEVICES

BACKGROUND

Humans may engage in human-to-computer dialogs with interactive software applications referred to herein as "automated assistants" (also referred to as "chatbots," "virtual assistants," "interactive personal assistants," "intelligent personal assistants," "personal voice assistants," "conversational agents," etc.). For example, humans (which when they interact with automated assistants may be referred to as "users") may provide commands, queries, and/or requests using free form natural language input which may include vocal utterances converted into text and then processed and/or typed free form natural language input.

In many cases, before the automated assistant can interpret and respond to a user's request, it must first be "invoked," e.g., using predefined oral invocation phrases that are often referred to as "hot words" or "wake words." Once the automated assistant is invoked with one or more of the set of hot words, it may operate in what will be referred to herein as a "speech recognition state" or "general listening state" in which it performs speech-to-text ("STT") processing of audio data sampled by a microphone to generate textual input, which in turn is semantically processed to determine a user's intent (and to fulfill that intent).

SUMMARY

It is not uncommon for multiple electronic devices in an environment such as a room to be equipped to interact with an automated assistant. For example, a user may be carrying an assistant-capable mobile phone when he or she walks into a room with an assistant-capable standalone interactive speaker, an assistant-capable smart television, etc. When a user utters a hot word or phrase in such an environment, the automated assistant may be invoked on multiple electronic devices at once, even though the user may desire that one particular electronic device respond. Accordingly, implementations described herein are directed to arbitration between multiple potentially-responsive electronic devices to determine which should respond to the user's utterance, and/or which should defer to other electronic device(s).

In various implementations, upon detecting hot word(s) in a spoken utterance, multiple electronic devices may render output in the form of sound and/or light. Some electronic devices emit audible and/or visual output already in order to inform the user that the electronic device has transitioned into the speech recognition or general listening state. This output may be encoded with information that can be extracted by other electronic devices to determine which electronic device should respond to the spoken utterance. In some implementations, the output is encoded with a timestamp that indicates the moment in time at which the respective electronic device detected the spoken utterance. (e.g., the beginning of the utterance, the end of the utterance, etc.). This timestamp may be detected by the other electronic devices, e.g., by those electronic devices decoding the emitted output.

Each electronic device may then use the various timestamps to determine whether it should respond to the spoken utterance (e.g., by invoking the automated assistant) or defer to another of the electronic devices. For example, each electronic device may compare its own local timestamp—e.g., a time corresponding to that electronic device detecting the spoken utterance—to timestamps received from other electronic devices. If a given electronic device's local timestamp is earlier than (e.g., less than) other electronic devices' timestamps, the given electronic device may give itself priority over the other electronic devices and respond to the spoken utterance, e.g., by invoking the automated assistant.

The other electronic devices may perform similar comparisons as the given electronic device to determine that their own timestamps are not first, and therefore they should stand down. In the unlikely event that two electronic devices determine (and emit output encoding) the exact same timestamp—which will be exceedingly rare given the granularity/precision of many timestamps generated by modern electronic devices—random selection (e.g., comparing random 64 bit values generated at each electronic device) or other techniques (e.g., contextual cues) may be used to break the tie.

In some implementations, an electronic device may alter its local timestamp in order to prioritize or deprioritize itself relative to other electronic devices. For example, an electronic device may subtract time from its local timestamp so that its local timestamp appears earlier, thus potentially prioritizing itself relative to other electronic devices. Alternatively, an electronic device may add time to its local timestamp so that its local timestamp appears later, thus potentially deprioritizing itself relative to other electronic devices.

Electronic devices may prioritize/deprioritize themselves based on a variety of different contextual cues. As one example, a driver of a vehicle may interact with an automated assistant to get directions, play music, make handsfree phone calls, etc. To avoid distractions, the driver may desire that a particular assistant-capable electronic device—such as a vehicular computer system integral with the vehicle—responds to the driver's request. If other electronic devices in the vehicle, such as the driver's smart phone or smart watch, or electronic devices carried by passengers, also respond to the driver's spoken utterances, the driver may become distracted attempting to arbitrate between the electronic devices. Accordingly, in some implementations, particular electronic devices such as assistant-capable vehicular computer systems, or even smart phones that are plugged into and project an automotive app onto a vehicle's console, may prioritize themselves to prevent other electronic devices from inundating the driver with multiple responses to the driver's spoken utterance.

In some implementations, electronic devices may "learn" how to prioritize themselves over time. As one non-limiting example, suppose that when a user in her kitchen utters a hot word, both her phone and a standalone interactive speaker respond. Suppose further that the user takes some action to indicate that she wanted the speaker, and not the phone, to respond (e.g., if she's playing music, the speaker may be more suitable than her phone). The user's phone may learn that whenever it is co-present with that standalone interactive speaker—or with standalone interactive speakers in general—the phone should add time to its local timestamp to increase the likelihood the interactive speaker's timestamp preempts the phone's local timestamp. In some implementations, electronic devices may detect co-presence of other electronic devices using, for instance, wireless communication (e.g., Bluetooth), position coordinate comparisons, being connected to the same wireless network, using vision sensor data and object recognition, etc.

There may be situations in which a user desires that one electronic device responds to her spoken utterance, but another electronic device detects the spoken utterance first and therefore has an earlier timestamp. In some implementations, one or both of these electronic devices may use techniques described herein to "handoff" the user to the other device, e.g., by the electronic device itself going inactive and/or emitting output that is encoded with information that causes the other electronic device to respond.

As an example, a user may intend to invoke an automated assistant on a nearby standalone interactive speaker to play music, but when she utters the hot word(s), the smart phone in her pocket responds because, for instance, it detected her utterance sooner than the relatively distant standalone interactive speaker, or because the smart phone has more computing power and/or a better machine learning model than the interactive speaker. The user can then provide input that indicates she didn't want her smart phone to respond, e.g., by saying "never mind," swiping closed a music application on her phone, or even providing more detail such as "No, I want my kitchen speaker to respond." In various implementations, the user's smart phone may emit audible or visual "standing down" output encoded with a command or message.

When this standing down output is decoded by the standalone interactive speaker, the decoded command or message may cause the standalone speaker to take various actions, such as invoking the automated assistant and awaiting a subsequent command from the user. In some implementations, the message or command may include information that helps other nearby electronic devices determine whether they should respond or not. For example, the command or message may include an identifier of an electronic device (e.g., "kitchen speaker") or an electronic device "category" or "type" (e.g., standalone speakers, smart televisions, smart watches, etc.), which should be matched by the electronic device that responds. In some implementations, if multiple other electronic devices detect the smart phone's standing down output, each may emit its own output with its own local timestamp, and the device having the earliest timestamp may respond, as described previously.

In some implementations, a method performed by one or more processors is provided that includes: detecting, at a microphone of the first electronic device, a spoken utterance provided by a user; detecting one or more sounds emitted by one or more additional electronic devices at the microphone, wherein each of the one or more sounds encodes a timestamp corresponding to detection of the spoken utterance at a respective electronic device of the one or more additional electronic devices; extracting, from the one or more sounds emitted by the one or more additional electronic devices, the one or more timestamps; comparing the one or more timestamps to a local timestamp corresponding to detection of the spoken utterance at the first electronic device; and based on the comparing, causing the first electronic device to either invoke an automated assistant locally or defer to one of the additional electronic devices.

In various implementations, the method may further include causing the first electronic device to emit another sound, wherein the another sound encodes the local timestamp. In various implementations, the method may further include, prior to the comparing, altering the local timestamp based on one or more contextual cues.

In various implementations, the one or more contextual cues may include the first electronic device being assigned a different priority than the one or more additional devices. In various implementations, the first electronic device may be assigned the priority based on the first electronic device being integral with a vehicle. In various implementations, the priority assigned to the first electronic device may be lower than one or more priorities assigned to the one or more additional electronic devices that are integral with a vehicle. In various implementations, the altering may include adding or subtracting time from the local timestamp.

In various implementations, the method may further: subsequent to causing the first electronic device to invoke the automated assistant locally, detecting negative feedback from the user; and causing the first electronic device to emit another sound, wherein the another sound causes the one of the additional electronic devices to invoke the automated assistant. In various implementations, the method may further include causing the first electronic device to defer to the one of the additional electronic devices. In various implementations, detecting the negative feedback may include: detecting a follow-up spoken utterance at the microphone; and processing the follow-up spoken utterance to determine that the user intended that the automated assistant be invoked on one of the additional electronic devices.

Another similar method may include: detecting, at a microphone of the first electronic device, a spoken utterance provided by a user; detecting one or more outputs emitted by one or more additional electronic devices, wherein each of the one or more outputs encodes a timestamp corresponding to detection of the spoken utterance at a respective electronic device of the one or more additional electronic devices; extracting, from the one or more outputs emitted by the one or more additional electronic devices, the one or more timestamps; comparing the one or more timestamps to a local timestamp corresponding to detection of the spoken utterance at the first electronic device; and based on the comparison, causing the first electronic device to either invoke an automated assistant locally or defer to one of the additional electronic devices.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
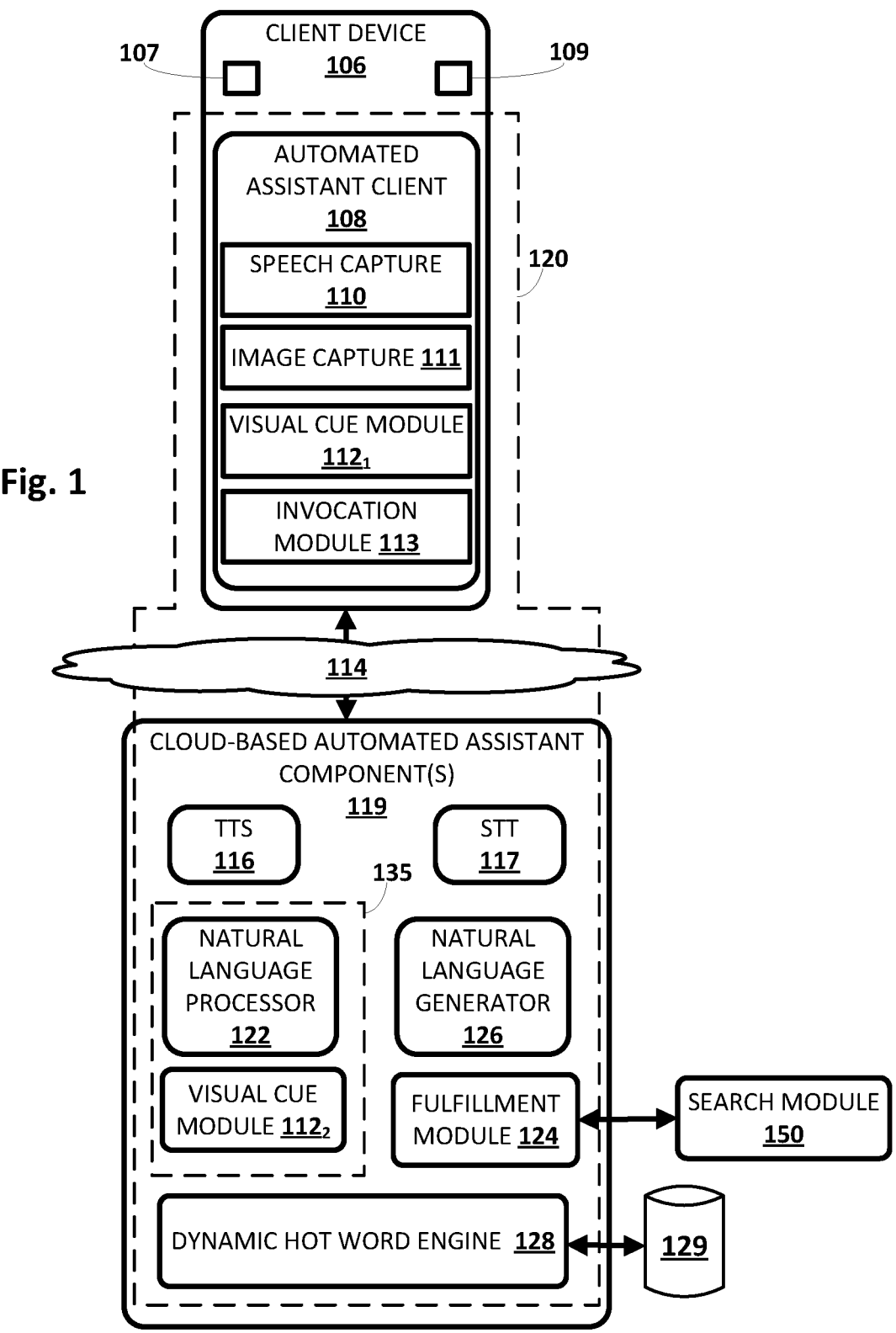
FIG. 1 is a block diagram of an example environment in which implementations disclosed herein may be deployed.

Now turning to FIG. 1, an example environment in which techniques disclosed herein may be implemented is illustrated. The example environment includes one or more client computing devices 106. Each client device 106 may execute a respective instance of an automated assistant client 108, which may also be referred to herein as a "client portion" of an automated assistant. One or more cloud-based automated assistant components 119, which may also be referred to herein collectively as a "server portion" of an automated assistant, may be implemented on one or more computing systems (collectively referred to as a "cloud" computing system) that are communicatively coupled to client devices 106 via one or more local and/or wide area networks (e.g., the Internet) indicated generally at 114.

In various implementations, an instance of an automated assistant client 108, by way of its interactions with one or more cloud-based automated assistant components 119, may form what appears to be, from the user's perspective, a logical instance of an automated assistant 120 with which the user may engage in a human-to-computer dialog. One instance of such an automated assistant 120 is depicted in FIG. 1 in dashed line. It thus should be understood that each user that engages with an automated assistant client 108 executing on a client device 106 may, in effect, engage with his or her own logical instance of an automated assistant 120. For the sake of brevity and simplicity, the term "automated assistant" as used herein as "serving" a particular user will refer to any combination of an automated assistant client 108 executing on a client device 106 operated by the user and one or more cloud-based automated assistant components 119 (which may be shared amongst multiple automated assistant clients 108). It should also be understood that in some implementations, automated assistant 120 may respond to a request from any user regardless of whether the user is actually "served" by that particular instance of automated assistant 120.

The one or more client devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided. Some client devices 106, such as standalone interactive speakers (or "smart speakers"), may take the form of assistant devices that are primarily designed to facilitate dialog between users and automated assistant 120. Some such assistant devices may take the form of a standalone interactive speaker with an attached display, which may or may not be a touchscreen display.

In some implementations, client device 106 may be equipped with one or more vision sensors 107 having one or more fields of view, although this is not required. Vision sensor(s) 107 may take various forms, such as digital cameras, passive infrared ("PIR") sensors, stereoscopic cameras, RGBd cameras, etc. The one or more vision sensors 107 may be used, e.g., by an image capture module 111, to capture image frames (still images or video) of an environment in which client device 106 is deployed. These image frames may then be analyzed, e.g., by a visual cue module $112_1$, to detect user-provided visual cues contained in the image frames. These visual cues may include but are not limited to hand gestures, gazes towards particular reference points, facial expressions, predefined movements by users, etc. These detected visual cues may be used for various purposes, such as invoking automated assistant 120 and/or causing automated assistant 120 to take various actions.

As described in more detail herein, automated assistant 120 engages in human-to-computer dialog sessions with one or more users via user interface input and output devices of one or more client devices 106. In some implementations, automated assistant 120 may engage in a human-to-computer dialog session with a user in response to user interface input provided by the user via one or more user interface input devices of one of the client devices 106. In some of those implementations, the user interface input is explicitly directed to automated assistant 120. For example, a user may verbally provide (e.g., type, speak) a predetermined invocation phrase, such as "OK, Assistant," or "Hey, Assistant," to cause automated assistant 120 to begin actively listening. Additionally or alternatively, in some implementations, automated assistant 120 may be invoked based on one or more detected visual cues, alone or in combination with oral invocation phrases.

In some implementations, automated assistant 120 may utilize speech recognition to convert utterances from users into text, and respond to the text accordingly, e.g., by providing search results, general information, and/or taking one or more responsive actions (e.g., playing media, launching a game, ordering food, etc.). In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of client computing device 106 and computing device(s) operating cloud-based automated assistant components 119 may include one or more memories for storage of data and software applications, one or more processors for accessing data and executing applications, and other components that facilitate communication over a network. The operations performed by client computing device 106 and/or by automated assistant 120 may be distributed across multiple computer systems. Automated assistant 120 may be implemented as, for example, computer programs running on one or more computers in one or more locations that are coupled to each other through a network.

As noted above, in various implementations, client computing device 106 may operate an automated assistant client 108, or "client portion" of automated assistant 120. In various implementations, automated assistant client 108 may include a speech capture module 110, the aforementioned image capture module 111, a visual cue module $112_1$, and/or an invocation module 113. In other implementations, one or more aspects of speech capture module 110, image capture module 111, visual cue module 112, and/or invocation module 113 may be implemented separately from automated assistant client 108, e.g., by one or more cloud-based automated assistant components 119. For example, in FIG. 1, there is also a cloud-based visual cue module $112_2$ that may detect visual cues in image data.

In various implementations, speech capture module 110, which may be implemented using any combination of hardware and software, may interface with hardware such as a microphone 109 or another pressure sensor to capture an audio recording of a user's utterance(s). Various types of processing may be performed on this audio recording for various purposes. In some implementations, image capture module 111, which may be implemented using any combination of hardware or software, may be configured to interface with vision sensor 107 to capture one or more image frames (e.g., digital photographs) that correspond to a field of view of the vision sensor 107.

In various implementations, visual cue module $112_1$ (and/or cloud-based visual cue module $112_2$) may be implemented using any combination of hardware or software, and may be configured to analyze one or more image frames provided by image capture module 111 to detect one or more visual cues captured in and/or across the one or more image frames. Visual cue module $112_1$ may employ a variety of techniques to detect visual cues. For example, visual cue module $112_2$ may use one or more artificial intelligence (or machine learning) models that are trained to generate output indicative of detected user-provided visual cues in image frames.

Speech capture module 110 may be configured to capture a user's speech, e.g., via a microphone 109, as mentioned previously. Additionally or alternatively, in some implementations, speech capture module 110 may be further configured to convert that captured audio to text and/or to other representations or embeddings, e.g., using speech-to-text ("STT") processing techniques. Additionally or alternatively, in some implementations, speech capture module 110 may be configured to convert text to computer-synthesized speech, e.g., using one or more voice synthesizers. However, in some (but not all) cases, client device 106 may be relatively constrained in terms of computing resources (e.g., processor cycles, memory, battery, etc.). Accordingly, speech capture module 110 local to client device 106 may be configured to convert a finite number of different spoken phrases—particularly hot words and phrases that invoke automated assistant 120—to text (or to other forms, such as lower dimensionality embeddings). Other speech input may be sent to cloud-based automated assistant components 119, which may include a cloud-based text-to-speech ("TTS") module 116 and/or a cloud-based STT module 117.

In various implementations, invocation module 113 may be configured to determine whether to invoke automated assistant 120, e.g., based on output provided by speech capture module 110 and/or visual cue module $112_1$ (which in some implementations may be combined with image capture module 111 in a single module). For example, invocation module 113 may determine whether a user's utterance qualifies as an invocation phrase that should initiate a human-to-computer dialog session with automated assistant 120. In some implementations, invocation module 113 may analyze data indicative of the user's utterance, such as an audio recording or a vector of features extracted from the audio recording (e.g., an embedding), alone or in conjunction with one or more visual cues detected by visual cue module $112_1$. In some implementations, a threshold that is employed by invocation module 113 to determine whether to invoke automated assistant 120 in response to a vocal utterance may be lowered when particular visual cues are also detected. Consequently, even when a user provides a vocal utterance that is different from but somewhat phonetically similar to the proper invocation phrase, "OK assistant," that utterance may nonetheless be accepted as a proper invocation when detected in conjunction with a visual cue (e.g., hand waving by the speaker, speaker gazes directly into vision sensor 107, etc.).

In some implementations, one or more on-device invocation models may be used by invocation module 113 to determine whether an utterance and/or visual cue(s) qualify as an invocation. Such an on-device invocation model may be trained to detect variations of invocation phrases/gestures. For example, in some implementations, the on-device invocation model (e.g., one or more neural networks) may be trained using federated learning and/or training examples that each include an audio recording (or an extracted feature vector) of an utterance from a user, as well as data indicative of one or more image frames and/or detected visual cues captured contemporaneously with the utterance.

Invocation module 113 may also be configured to perform selected aspects of the present disclosure in order to facilitate arbitration between multiple potentially-responsive client devices 106 (alternatively, "electronic devices") to determine which should respond to the user's utterance, and/or which should defer to other client device(s) 106. For example, invocation module 113 may generate/retrieve a timestamp at various moments in time associated with invoking automated assistant 120. For example, invocation module 113 may generate a local timestamp at the moment it determines that an utterance captured from a user qualifies as a hot word that should transition automated assistant 120 into a general listening state. Alternatively, invocation module 113 may generate a local timestamp at the moment it begins capturing an utterance that is ultimately deemed sufficient to invoke automated assistant 120. Other moments corresponding to detection of the spoken utterance of hot word(s) are contemplated.

Nearby client devices 106 may also generate their own local timestamps at similar moments when they capture the same utterance at their respective microphones. Then, each client device 106, e.g., by way of a respective invocation module 113, may render audio and/or visual output that encodes that device's respective local timestamp. Each client device 106 may capture the outputs from the other client devices and extract timestamps from the outputs.

Each client device 106 may then compare its own local timestamp to the other timestamps to determine whether it was "first" in detecting the hot word(s), or if another client device "heard" the hot word(s) first. If invocation module 113 on a particular client device 106 determines that its local timestamp preempts all the other timestamps from the other client devices, then that instance of invocation module 113 may invoke automated assistant 120. Other instances of invocation module 113 on other client devices may defer to client device(s) 106 having earlier timestamp(s).

The output in which client devices 106 encode their local timestamps can take various forms. The encoded output need not necessarily be perceivable to human eyes or ears, although it can be. Some assistant devices already emit a "chirp" or similar sound when automated assistant 120 is invoked to inform the user that automated assistant 120 is now listening. In some such cases, the assistant device may also energize one or more light sources to also inform the user that automated assistant 120 is now listening. In various implementations, invocation module 113 may modulate these existing audio and/or visual outputs to carry information, including the timestamps mentioned above.

Even if the audio and/or visual output is, generally speaking, perceivable by humans, humans may not necessarily be able to perceive the modulated information. For example, light and/or sound may be modulated at frequencies that cannot be perceived by humans. Additionally or alternatively, in some implementations, output that is not perceivable to humans, such as ultrasound audio or infrared visual output, may be modulated with timestamps and other information as described herein.

Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture module 110, which may then convert the textual data into computer-generated speech that is output locally.

Cloud-based STT module 117 may be configured to leverage the virtually limitless resources of the cloud to convert audio data captured by speech capture module 110 into text, which may then be provided to intent matcher 135. In some implementations, cloud-based STT module 117 may convert an audio recording of speech to one or more phonemes, and then convert the one or more phonemes to text. Additionally or alternatively, in some implementations, STT module 117 may employ a state decoding graph. In some implementations, STT module 117 may generate a plurality of candidate textual interpretations of the user's utterance. In some implementations, STT module 117 may weight or bias particular candidate textual interpretations higher than others depending on whether there are contemporaneously detected visual cues.

Automated assistant 120 (and in particular, cloud-based automated assistant components 119) may include intent matcher 135, the aforementioned TTS module 116, the aforementioned STT module 117, and other components that are described in more detail below. In some implementations, one or more of the modules and/or modules of automated assistant 120 may be omitted, combined, and/or implemented in a component that is separate from automated assistant 120. In some implementations, to protect privacy, one or more of the components of automated assistant 120, such as natural language processor 122, TTS module 116, STT module 117, etc., may be implemented at least on part on client devices 106 (e.g., to the exclusion of the cloud).

In some implementations, automated assistant 120 generates responsive content in response to various inputs generated by a user of one of the client devices 106 during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via client device 106. As used herein, free-form input is input that is formulated by a user and that is not constrained to a group of options presented for selection by the user.

An intent matcher 135 may be configured to determine a user's intent based on input(s) (e.g., vocal utterances, visual cues, etc.) provided by the user and/or based on other signals, such as sensor signals, online signals (e.g., data obtained from web services), and so forth. In some implementations, intent matcher 135 may include a natural language processor 122 and the aforementioned cloud-based visual cue module $112_2$. In various implementations, cloud-based visual cue module $112_2$ may operate similarly to visual cue module $112_1$ except that cloud-based visual cue module $112_2$ may have more resources at its disposal. In particular, cloud-based visual cue module $112_2$ may detect visual cues that may be used by intent matcher 135, alone or in combination with other signals, to determine a user's intent.

Natural language processor 122 may be configured to process natural language input generated by user(s) via client device 106 and may generate annotated output (e.g., in textual form) for use by one or more other components of automated assistant 120. For example, the natural language processor 122 may process natural language free-form input that is generated by a user via one or more user interface input devices of client device 106. The generated annotated output includes one or more annotations of the natural language input and one or more (e.g., all) of the terms of the natural language input. In some implementations, the natural language processor 122 may include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

Intent matcher 135 may use various techniques to determine an intent of the user, e.g., based on output from natural language processor 122 (which may include annotations and terms of the natural language input) and/or based on output from visual cue module (e.g., $112_1$ and/or $112_2$). In some implementations, intent matcher 135 may have access to one or more databases (not depicted) that include, for instance, a plurality of mappings between grammars, visual cues, and responsive actions (or more generally, intents). In many cases, these grammars may be selected and/or learned over time, and may represent the most common intents of users. For example, one grammar, "play <artist>", may be mapped to an intent that invokes a responsive action that causes music by the <artist> to be played on the client device 106 operated by the user. Another grammar, "[weather|forecast] today," may be match-able to user queries such as "what's the weather today" and "what's the forecast for today?"

In addition to or instead of grammars, in some implementations, intent matcher 135 may employ one or more trained machine learning models, alone or in combination with one or more grammars and/or visual cues. These trained machine learning models may also be stored in one or more databases and may be trained to identify intents, e.g., by embedding data indicative of a user's utterance and/or any detected user-provided visual cues into a reduced dimensionality space, and then determining which other embeddings (and therefore, intents) are most proximate, e.g., using techniques such as Euclidean distance, cosine similarity, etc.

Fulfillment module 124 may be configured to receive the predicted/estimated intent that is output by intent matcher 135, as well as associated slot values (whether provided by the user proactively or solicited from the user) and fulfill (or "resolve") the intent. In various implementations, fulfillment (or "resolution") of the user's intent may cause various fulfillment information (also referred to as "responsive" information or "resolution information") to be generated/obtained, e.g., by fulfillment module 124. As will be described below, the fulfillment information may in some implementations be provided to a natural language generator ("NLG" in some FIG. 126, which may generate natural language output based on the fulfillment information.

Fulfillment (or "resolution") information may take various forms because an intent can be fulfilled (or "resolved") in a variety of ways. Suppose a user requests pure information, such as "Where were the outdoor shots of 'The Shining' filmed?" The intent of the user may be determined, e.g., by intent matcher 135, as being a search query. The intent and content of the search query may be provided to fulfillment module 124, which as depicted in FIG. 1 may be in communication with one or more search modules 150 configured to search corpuses of documents and/or other data sources (e.g., knowledge graphs, etc.) for responsive information. Fulfillment module 124 may provide data indicative of the search query (e.g., the text of the query, a reduced dimensionality embedding, etc.) to search module 150. Search module 150 may provide responsive information, such as GPS coordinates, or other more explicit information, such as "Timberline Lodge, Mt. Hood, Oreg." This responsive information may form part of the fulfillment information generated by fulfillment module 124.

Additionally or alternatively, fulfillment module 124 may be configured to receive, e.g., from intent matcher 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, sending a message, etc. In some such implementations, fulfillment information may include slot values associated with the fulfillment, confirmation responses (which may be selected from predetermined responses in some cases), etc.

Natural language generator 126 may be configured to generate and/or select natural language output (e.g., words/phrases that are designed to mimic human speech) based on data obtained from various sources. In some implementations, natural language generator 126 may be configured to receive, as input, fulfillment information associated with fulfillment of an intent, and to generate natural language output based on the fulfillment information. Additionally or alternatively, natural language generator 126 may receive information from other sources, such as third party applications (e.g., required slots), which it may use to compose natural language output for the user.

Figure 2A:
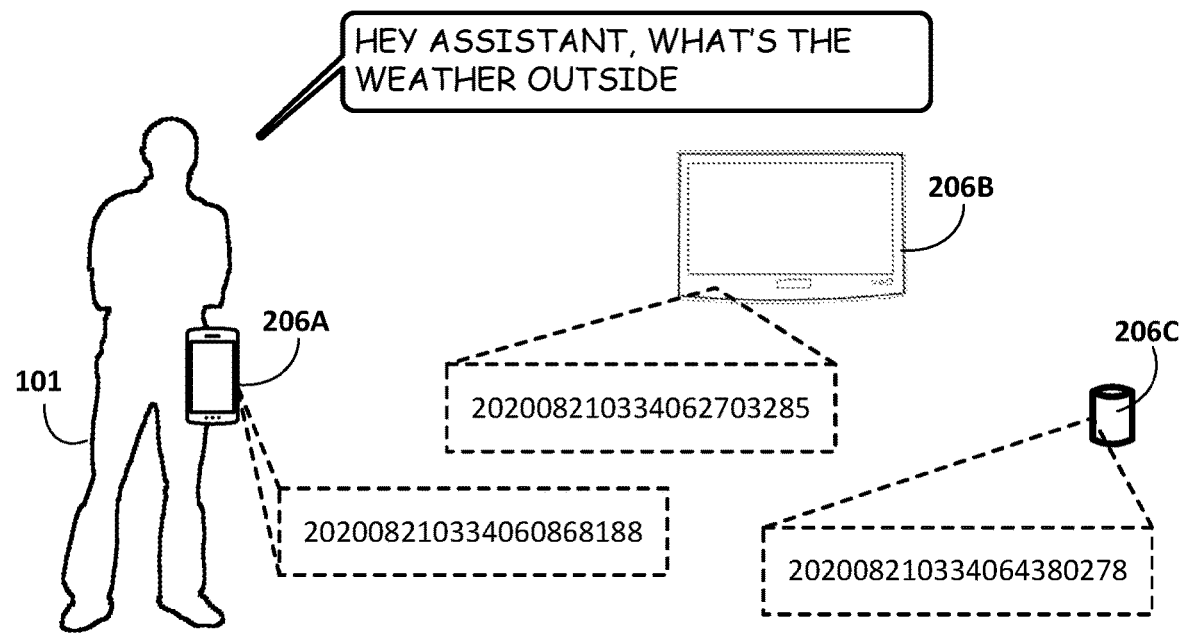
FIGS. 2A and 2B schematically demonstrate one example scenario in which selected aspects of the present disclosure may be implemented, in accordance with various implementations.
Figure 2B:
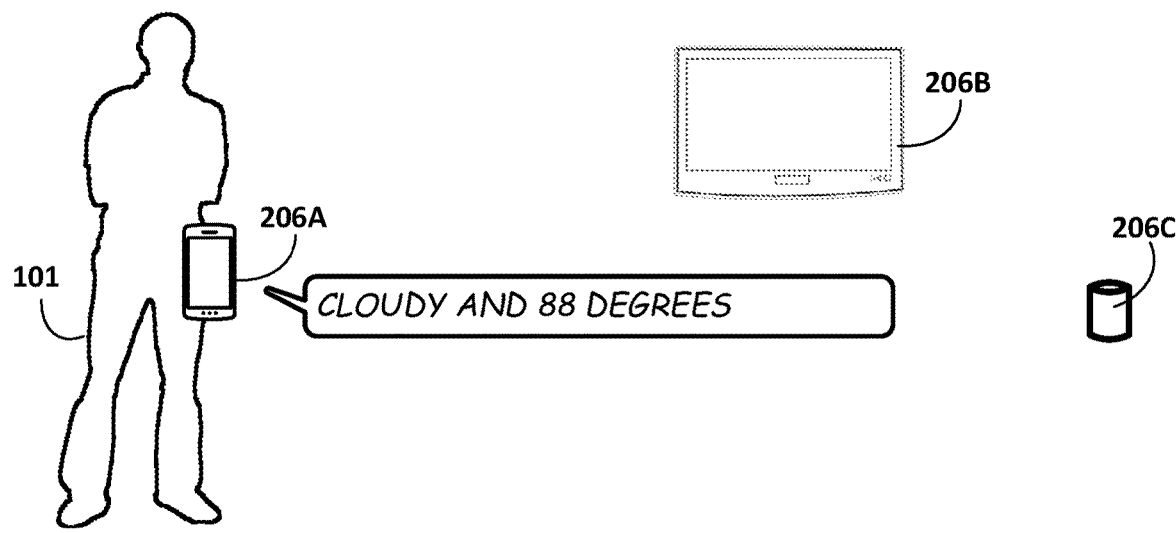

FIGS. 2A and 2B schematically depict an example scenario in which selected aspects of the present disclosure may be implemented in order to arbitrate between multiple potentially responsive electronic devices. In FIG. 2A, a user 101 is co-present with three assistant-equipped electronic devices: a first electronic device 206A in the form of a smart phone carried at the waist of user 101; a second electronic device 206B in the form of a smart television (which may be natively equipped for implementing automated assistant 120 or may be equipped with a smart "dongle" to facilitate interaction with automated assistant 120); and a third electronic device 106C in the form of a standalone interactive speaker.

In FIG. 2A, user 101 utters the hot words, "Hey Assistant," and then the command "what's the weather outside?" Each of electronic devices 206A-C detects the hot words at slightly different times. These slightly different times may be a result of the sound waves of the user's voice having to travel farther to, for instance, third electronic device 206C than they do to first electronic device 206A. Alternatively, different electronic devices 206 may have different processing capabilities, may have different invocation models trained with different data, may generate a timestamp at a different moment (e.g., beginning of the utterance versus the end of the utterance), and so forth.

In any case, as shown by the dashed boxes, each electronic device emits output (e.g., audio and/or visual) that is encoded with its own local timestamp. For example, first electronic device 206A emits output that encodes its local timestamp, 202008210334060868188. Second electronic device 206B emits output that encodes its local timestamp, 202008210334062703285. And third electronic device 206C emits output that encodes its local timestamp, 202008210334064380278.

All three timestamps share in common the first fourteen digits, 20200821033406, which happens to represent Aug. 21, 2020 at 3:34:06. However, the remaining seven digits begin to diverge because they represent (from left to right) increasingly more granular units of time. Thus, the timestamp emitted by first electronic device 206A is 0.0868188 seconds. The timestamp emitted by second electronic device 206B is 0.2703285 seconds. And the timestamp emitted by third electronic device 206C is 0.4380278 seconds. From these numbers it can be intuited that the three electronic devices "heard" the utterance in the order of their respective distances from user 101.

Each of electronic devices 206A-C may capture, e.g., using a microphone and/or a light sensor such as a camera or photodiode, the output emitted by the other electronic devices, and may decode the other timestamps from that captured output. Then, each electronic device 206 can compare its local timestamp to the timestamps it received from the other electronic devices to determine whether it should respond to the user's request, or whether it should defer to other electronic device(s).

For example, first electronic device 206A may determine that its timestamp (with 0.0868188 seconds) is earlier than the other two timestamps. Consequently, in FIG. 2B, automated assistant 120 responds via first electronic device 206A, "Cloudy and 88 degrees." Second electronic device 206B and third electronic device 206C determine that their local timestamps are not first, and therefore they defer to first electronic device 206A. Notably the timestamps used in this example, and available in most modern electronic devices, are granular enough that the likelihood of two electronic devices generating identical timestamps is remote. Even if that happens, a tiebreaker may be implemented using, for example, random selection or contextual cues.

Sometimes a user may not wish for the closest electronic device to respond to the user's request to invoke automated assistant 120. For example, a user may forget about a smart phone in the user's pocket when the user asks an interactive speaker to play some music. Accordingly, techniques are described herein to allow a user to cause one electronic device to "handoff" control to another electronic device.

Figure 3:
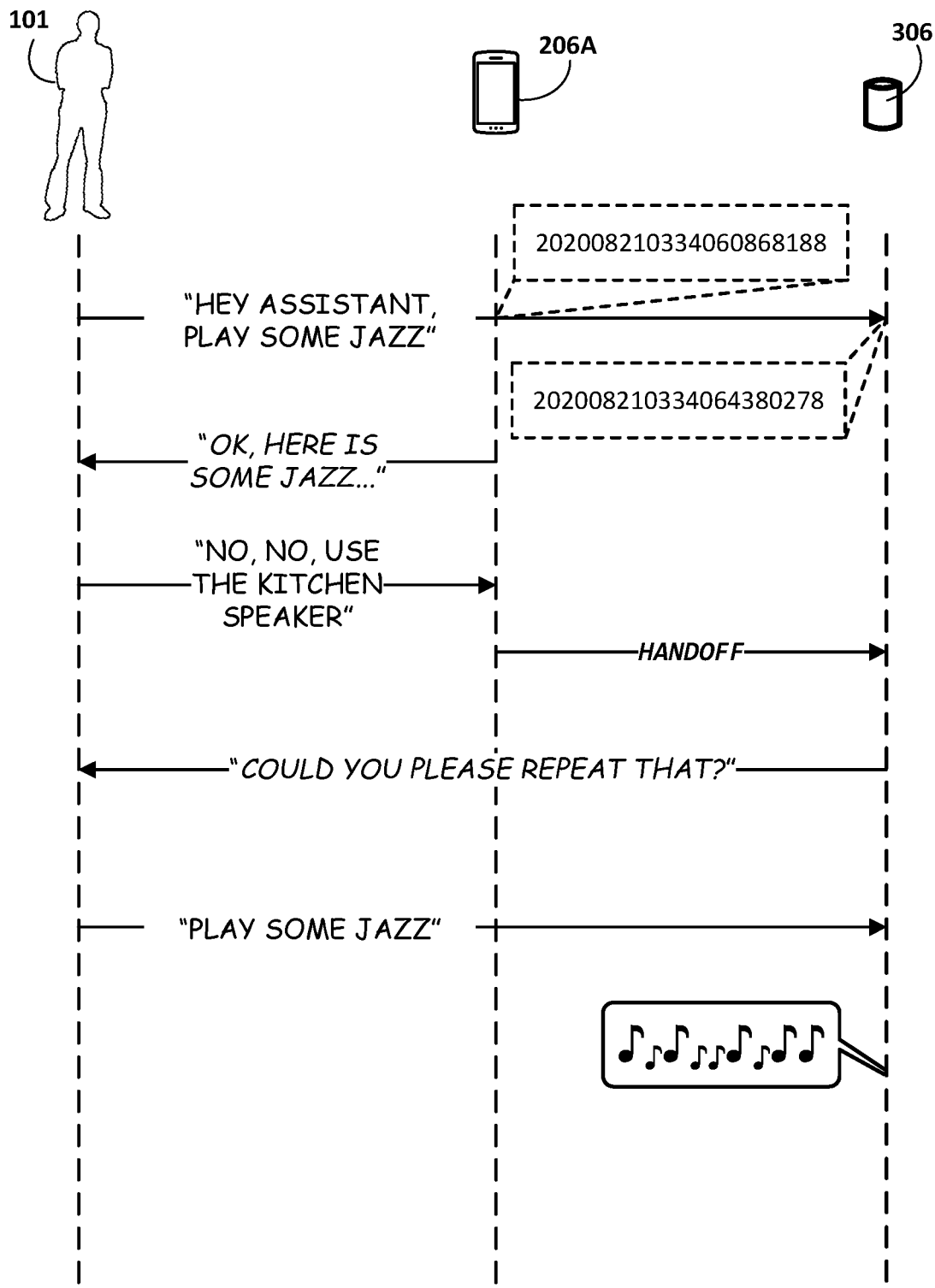
FIG. 3 schematically depicts another scenario in which disclosed techniques may be employed.

Referring now to FIG. 3, a user 101 has entered a space that includes a first electronic device 306A in the form of the user's smart phone (which may be in the user's pocket or hand, for example) and a second electronic device 306B in the form of a standalone interactive speaker. User 101 speaks the following utterance, "Hey assistant, play some jazz." As shown by the first arrow and dashed boxes, this utterance is captured by, and triggers local timestamp generation at, first electronic device 306A and then at second electronic device 306B. In particular, first electronic device 306A generates the local timestamp, 20200821033406086188, and second electronic device 306B generates the subsequent local timestamp, 20200821033406438027. Again, the last seven digits are 0.0868188 seconds and 0.4380278 seconds, respectively. Accordingly, first electronic device 306A is first and responds by invoking automated assistant 120, which outputs, "OK, here is some jazz."

At this point, user 101 provides negative feedback that causes first electronic device 306A to stop. In this example, user 101 says, "No, no, use the kitchen speaker." However, the user 101 could have provided negative feedback in other ways as well, such as using a gesture. In any case, this negative feedback causes first electronic device 306A to engage in a handoff process in which it passes control to second electronic device 306B (or at least stands down). This handoff may occur in various ways.

In some implementations, as part of the handoff process, first electronic device 306A may emit additional output (audio and/or visual) that encodes additional information indicating that first electronic device 306A is standing down (e.g., deferring to another electronic device, such as second electronic device 306B), as well as a new local timestamp. When this additional output is detected by another electronic device, it may extract the new local timestamp and compare it with any other new timestamp(s) it received from other electronic devices (if present) in response to the first electronic device standing down. Whichever electronic device has the earliest timestamp for detecting the stand down message from first electronic device 306A may then transition to a full listening state.

In some implementations, and as illustrated in FIG. 3, the newly-responsive device (second electronic device 306B in FIG. 3) may prompt the user to repeat his or her command, e.g., by rendering TTS output "Could you please repeat that?" Then, user 101 may repeat the command, "Play some jazz." Notably, to cause second electronic device 306B to play music, user 101 need not utter any hot word(s) because as part of the handoff process, second electronic device 306B is already in the fully-listening state. Of course, user 101 could have uttered a different command and so long as second electronic device 306B is in the fully-listening state, it would process the command as described above and respond accordingly.

In some implementations, as part of the handoff process, the electronic device that is standing down—first electronic device 306A in FIG. 3—may encode information into the output it renders as part of the handoff process ("stand down output") that signals which electronic device(s) should take over. In FIG. 3, for example, user 101 identified in the negative feedback which electronic device should respond to the user's request ("No, no, use the kitchen speaker"). Second electronic device 306B, which is a standalone speaker, may in fact be configured (e.g., as part of a coordinated ecosystem of devices controlled by user 101) with the name "kitchen speaker," and/or may be associated with a room having the name "kitchen." Accordingly, the phrase "kitchen speaker" or another identifier associated with second electronic device via the phrase "kitchen speaker" may be encoded into the stand down output rendered by first electronic device 306A. Second electronic device 306B matches the encoded identifier and so it responds; other electronic devices (not depicted in FIG. 3) that do not match the identifier "kitchen speaker" may defer.

It is not necessary that a precise identifier of an intended target electronic device be encoded in stand down output. In some implementations, an electronic device "category" or "type" may be encoded into the stand down output instead. Electronic device(s) that satisfy this category or type (e.g., are members) may respond, others may defer. In FIG. 3, for example, as part of the handoff process first electronic device 306A may encode the token "speaker" (or an equivalent identifier) into its stand down output. If second electronic device 306B (a speaker) is the only speaker that detects the stand down output from first electronic device 306A, then second electronic device 306B may take over control (e.g., and prompt the user to repeat the command as shown in FIG. 3). If more than one electronic device satisfying the "speaker" constraint detects the stand down output, then in some cases, multiple electronic devices may respond (which may be desirable if user 101 wishes to play music on multiple speakers). Alternatively, the multiple electronic devices that satisfy the "speaker" constraint may arbitrate amongst themselves by comparing local and received timestamps, as described previously.

In some implementations, first electronic device 306A may do more than facilitate transition of other electronic device(s) into fully-listening states. For example, in some implementations, first electronic device 306A may relay data indicative of the user's full command to other electronic devices, e.g., by encoding that data into the stand down output. Suppose prior to the negative feedback from user 101, first electronic device 306A successfully invokes automated assistant 120, and that automated assistant 120, e.g., by way of intent matcher 135, is able to process the user's command to generate a user intent (e.g., action="play music", type="jazz"). In some implementations, this intent may be available to first electronic device 306A so that first electronic device can encode this intent into its stand down output. Second electronic device 306B may extract this intent from the stand down output and may immediately start playing jazz music, rather than prompting user 101 to repeat the command.

In a related feature, in some implementations, an electronic device may be equipped with an input component (e.g., button, sensor, etc.) that is actuable, deliberately or in response to particular physical phenomena, in order to raise a signal that causes that electronic device to invoke automated assistant 120 and trigger a responsive action by automated assistant 120. Automated assistant 120 may be invoked locally, or in some cases, actuation of the input component may cause the electronic device to emit audio/visual output such as the chirp discussed previously. This output may be modulated by the electronic device to encode information that, when extracted by a remote electronic device (e.g., a smart phone), causes that remote electronic device to invoke automated assistant 120 and perform a responsive action. As one example, a wearable device worn by an elderly patient may be equipped with a sensor such as an accelerometer or gyroscope that detects when the patient falls. Detection of a fall may trigger the wearable device to emit a sound that may or may not be audible to humans, and that encodes information that causes a cellular-communication-equipped device such as a smart phone to call for emergency assistance.

In many instances, the electronic device that is in closest proximity to a speaker will most likely generate the earliest local timestamp and by default "win" the arbitration between multiple electronic devices. However, this may not be desirable in all circumstances. One example was depicted in FIG. 3, where user 101 preferred that a particular electronic device (306B) respond. In that case user 101 was able to trigger a handoff process to pass control to that target electronic device. However, a user may not always be well-situated or knowledgeable enough about available/ nearby devices to ensure that such a handoff occurs. And in some cases, such a handoff process may cause an invocation module 113 to "learn" a circumstance in which an electronic device should deprioritize itself relative to other electronic devices.

Accordingly, in various implementations, an electronic device may be configured to alter its local timestamp in order to prioritize or deprioritize itself relative to other electronic devices. An electronic device may prioritize itself by subtracting time from its local timestamp, e.g., to increase the likelihood that its local timestamp is earlier than other timestamps extracted from audio/visual output rendered by remote electronic device(s). Similarly, an electronic device may deprioritize itself by adding time to its local timestamp, e.g., to decrease the likelihood that its local timestamp is earlier than other timestamps extracted from audio/visual output rendered by remote electronic device(s).

In some implementations, an electronic device may prioritize/deprioritize itself under particular circumstances that are determined, for instance, based on one or more contextual cues. These contextual cues may include, for instance, the electronic device being assigned a different priority than the one or more additional electronic devices. For example, the electronic device may be assigned an artificially higher priority than other electronic devices based on it being integral with a vehicle, e.g., as part of a vehicular navigation system or a mobile phone that is paired with the vehicles computing system to "cast" content onto a dashboard display.

In some examples, a user may configure multiple electronic devices—e.g., multiple devices forming part of a coordinated ecosystem of devices—to have various priorities in general or in particular circumstances. For example, a user could configure his or her smart phone to deprioritize itself (e.g., by adding time to its timestamp) whenever the user enters a particular area, such as his or her residence, a particular room within the residence, a workplace, a geofence, etc. That way, commands issued by the user are more likely to be handled by other electronic devices in the area, which may be desirable if the user wishes to play music, control a television, engage in "ambient" computing, etc.

As another example, an electronic device may prioritize itself when it recognizes (e.g., using speaker recognition techniques) a speaker's voice, e.g., as coming from a user who has administrative privileges over that electronic device and/or other electronic devices in the same coordinated ecosystem. Likewise, an electronic device may deprioritize itself when it does not recognize a speaker's voice, e.g., to increase the likelihood that another electronic device nearby (that is potentially controlled by the speaker) may have the earliest timestamp.

In some implementations, an assistant-equipped smart phone may deprioritize itself (e.g., by adding time to its local timestamp) whenever it detects it is in a user's pocket (which often is a signal that the speaker is addressing a different electronic device). For example, a light sensor such as a camera or infrared sensor of a smart phone may detect darkness and conclude that it is in a user's pocket. Additionally or alternatively, an accelerometer and/or gyroscope of a smart phone may detect a particular movement rhythm and determine that this movement rhythm matches a gait of a user walking or running.

Figure 4A:
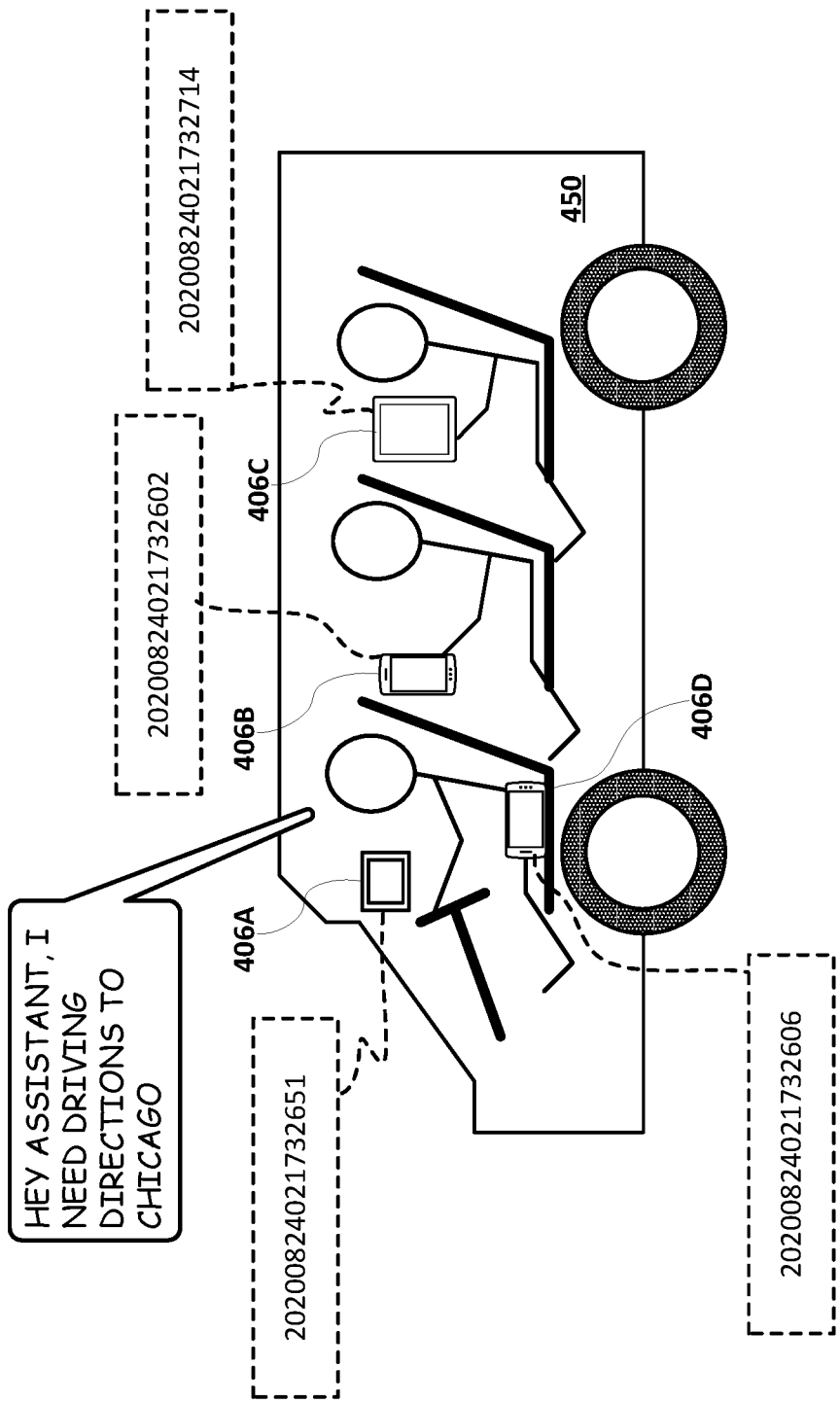
FIGS. 4A and 4B schematically depict another scenario in which disclosed techniques may be employed.
Figure 4B:
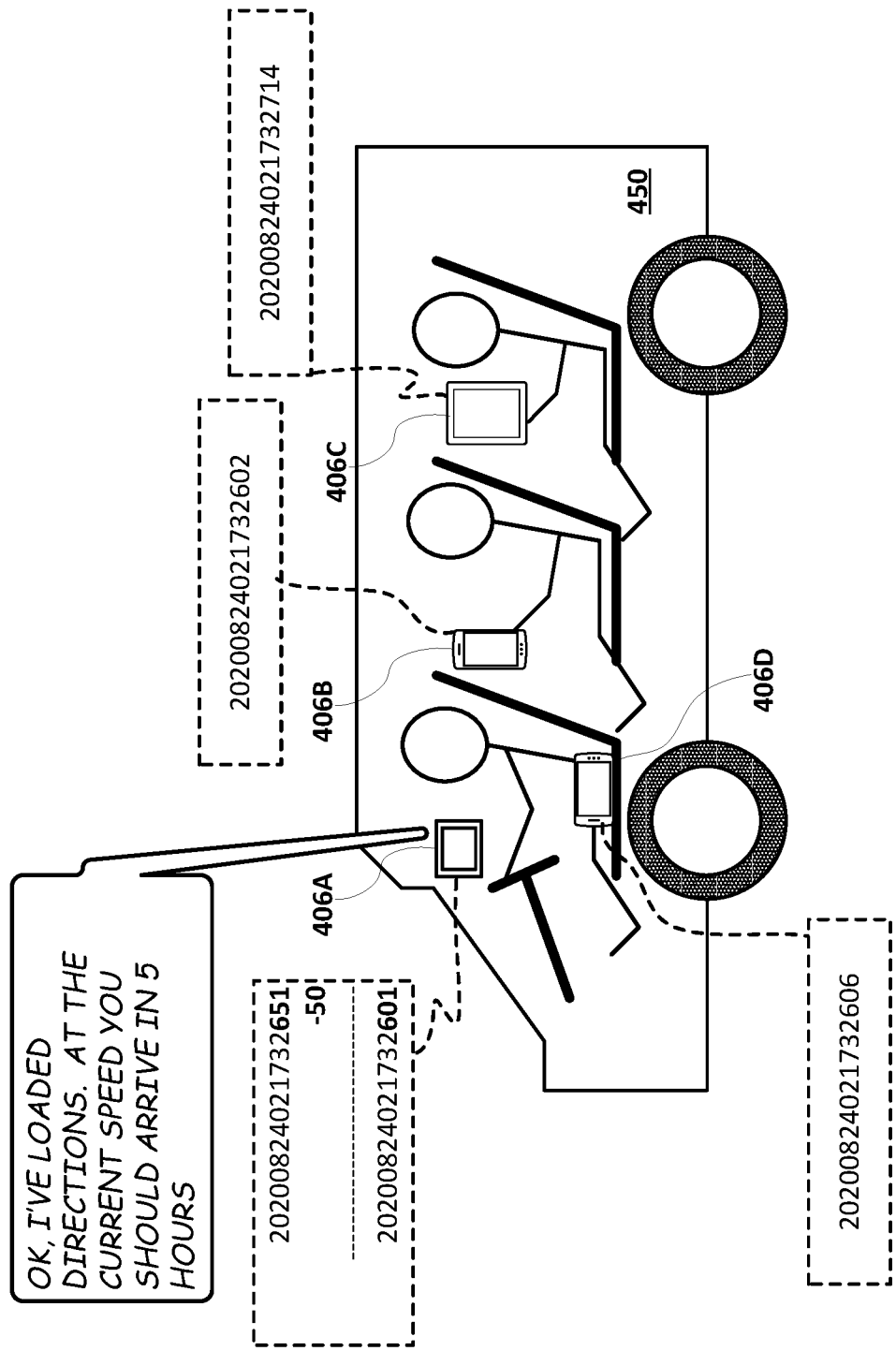

FIGS. 4A and 4B depict one non-limiting scenario in which an electronic device may prioritize itself relative to other nearby electronic devices. In FIG. 4A, three people are in a vehicle 450, with a driver up front (on the left) and two rows behind the driver, with each row having a passenger. A first electronic device 406A takes the form of a vehicular computing system such as a vehicular navigation system or a dashboard computing system that enables, among other things, controlling of a stereo of vehicle 450. A second electronic device 406B in the form of a smart phone is carried by the middle passenger, and a third electronic device 406C in the form of a tablet computer is carried by the rear passenger. The driver also carries in his or her pocket a fourth electronic device 406D in the form of another smart phone.

In FIG. 4A, the driver says, "Hey assistant, I need driving directions to Chicago." To avoid distractions, the driver may intend for this request to be fulfilled by first electronic device 406A. However, depending on the proximities of electronic devices 406A-D to the driver, which way the driver was facing when the statement was uttered, the processing capabilities of electronic devices 406A-D, and/or the configurations of electronic devices 406A-D, it is possible that another electronic device may generate an earlier timestamp than first electronic device 406A.

In FIG. 4A, for instance, each device renders audio and/or visual output that encodes its local timestamp. The timestamp generated by first electronic device 406A is 20200824021732651." The timestamp generated by second electronic device 406B is 20200824021732602." The timestamp generated by third electronic device 406C is 20200824021732714," which is unsurprising given that third electronic device 406C is farthest from the driver. The timestamp generated by fourth electronic device 406D is 20200824021732606," which is relatively early given the proximity of fourth electronic device 406D to the driver.

The first fourteen digits (20200824021732) are identical across the timestamps and therefore will not be discussed. The last three digits, which represent milliseconds, may be compared amongst electronic devices 406A-D to determine that second electronic device 406B (smart phone carried by the middle passenger) has the earliest timestamp of 602 milliseconds, or 0.602 seconds. This is clearly not ideal for the driver, who cannot readily view second electronic device 406B and may have trouble hearing audio output by second electronic device 406B.

Accordingly, and as demonstrated in FIG. 4B, in some implementations, first electronic device 406A may prioritize itself by subtracting time from its local timestamp. In FIG. 4B, first electronic device 406A subtracts fifty milliseconds from its timestamp to yield a new timestamp, 20200824021732601. Notably, there are now 601 milliseconds in the altered local timestamp generated by first electronic device 406A. This beats the timestamp (602 milliseconds) of second electronic device 406A by one millisecond, which is enough to give first electronic device 406A priority to fulfill the driver's request. Consequently, in FIG. 4B, automated assistant 120 is invoked and responds via first electronic device 406A by saying, "OK, I've loaded directions. At the current speed you should arrive in five hours."

In some implementations, other devices such as electronic devices 406B-C may detect that they are in vehicle 450. For example, they may monitor and detect changing position coordinates over time, or may detect movement from an accelerometer signal, social media status update, wireless signals emitted by vehicle 450 (e.g., in attempting to pair with electronic devices carried by the driver or passenger(s)), etc. These electronic devices may, in some implementations, deprioritize themselves to increase a likelihood that if there is an assistant-equipped electronic device that is integral with, or at least paired with, vehicle 450, that vehicular electronic device will have the earliest timestamp.

Figure 5:
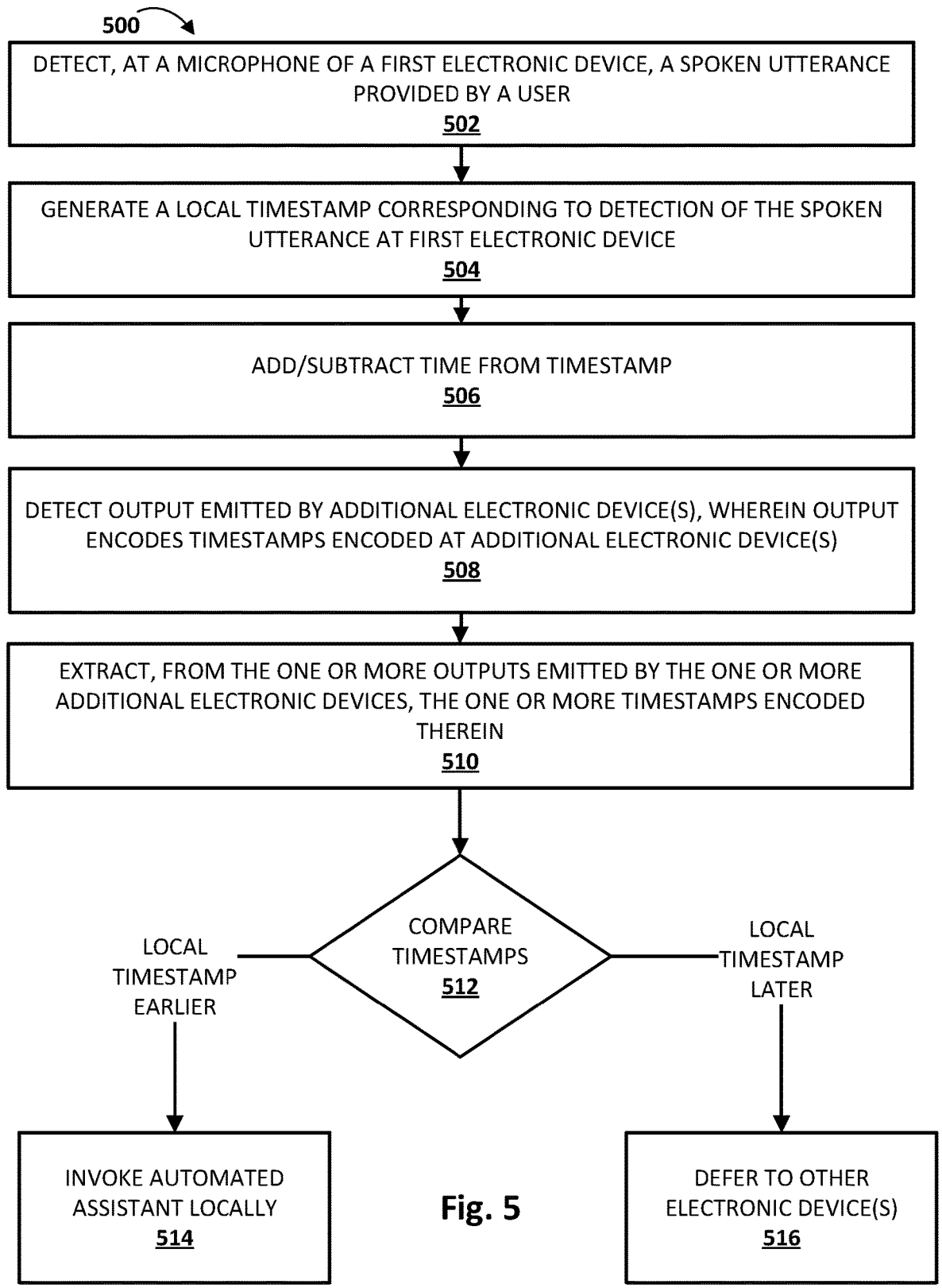
FIG. 5 depicts a flowchart illustrating an example method according to implementations disclosed herein.

FIG. 5 is a flowchart illustrating an example method 500 according to implementations disclosed herein. For convenience, the operations of the flow chart are described with reference to a system that performs the operations. This system may include various components of various computer systems, such as one or more components of automated assistant 120 and/or of invocation modules 113 operating on a client device 106. In some implementations, the operations of method 500 may be performed on each client/electronic device. Moreover, while operations of method 500 are shown in a particular order, this is not meant to be limiting. One or more operations may be reordered, omitted or added.

At block 502, the system may detect, at a microphone of a first electronic device, a spoken utterance provided by a user. At block 504, the system may generate a local timestamp for the first electronic device. This local timestamp may correspond to detection of the spoken utterance at the first electronic device, e.g., the moment at which hot word(s) are recognized, the moment at which automated assistant transitions into the general listening state, etc.

At block 506, depending on the circumstances, the system may add or subtract time from the local timestamp generated at block 504. For example, if the first electronic device is a vehicular computing system, the system may subtract some amount of time (e.g., fifty milliseconds, two-hundred milliseconds, etc.) from the local timestamp. If the first electronic device is a smart phone that is determined to be in the vehicle, or carried in a user's pocket, the system may add some amount of time to the local timestamp.

At block 508, the system may detect one or more outputs emitted by one or more additional electronic devices. If these outputs are audio-based (e.g., the chirps mentioned previously), then a microphone may capture them. If these outputs are visual-based, then a camera, vision sensor, light sensor, etc. may capture them. In various implementations, each of the one or more outputs encodes a timestamp corresponding to detection of the spoken utterance at a respective electronic device of the one or more additional electronic devices.

Thus, at block 510, the system may extract, from the one or more outputs emitted by the one or more additional electronic devices, the one or more timestamps encoded therein. One advantage of audio output over visual output is that with some types of visual output, line of sight may be required. However, in other cases, techniques such as infrared blasting, which illuminates nearby surfaces such as walls or ceilings, may be employed to avoid the line-of-sight requirement.

At block 512, the system may compare the one or more timestamps extracted at block 510 from the output(s) of the remote electronic device(s) to the local timestamp generated by/for the first electronic device at block 504. Based on the comparison at block 512, the system may either cause the first electronic device to invoke an automated assistant locally at block 514, or defer to one of the additional electronic devices at block 516.

Figure 6:
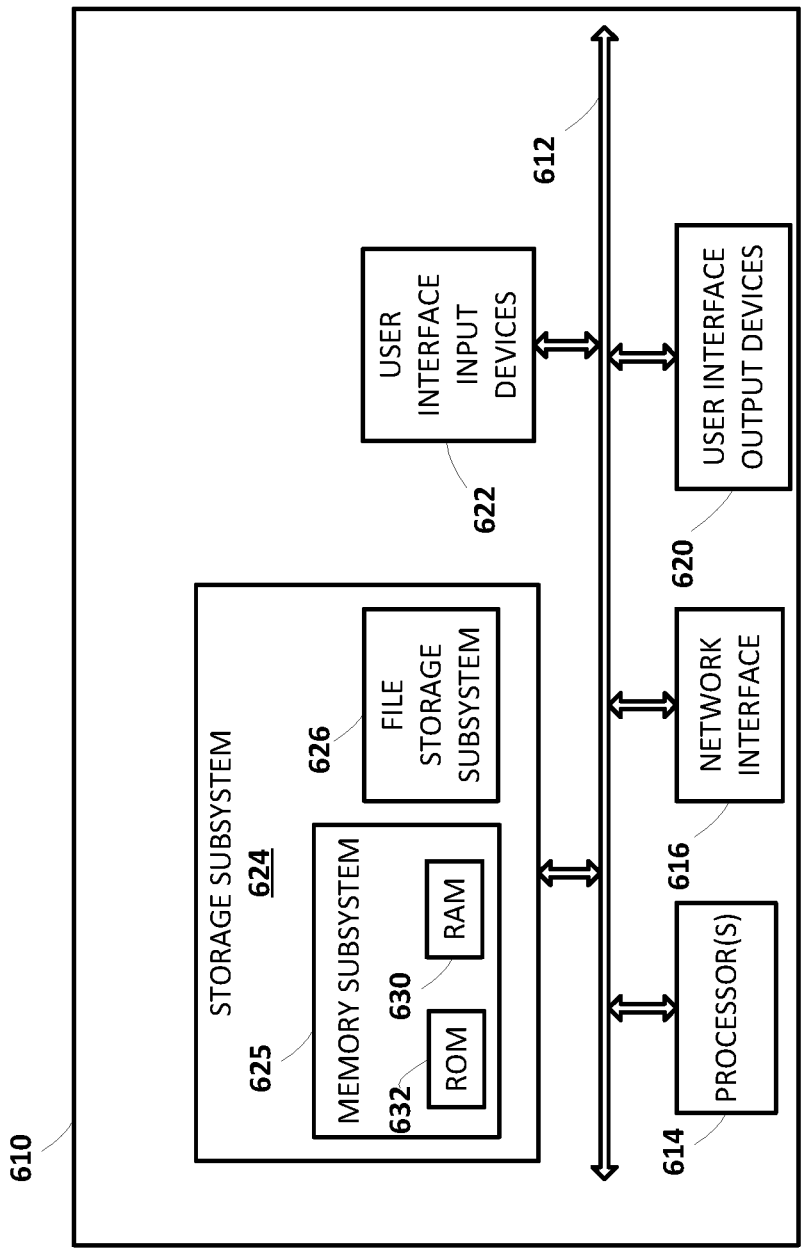
FIG. 6 illustrates an example architecture of a computing device.

FIG. 6 is a block diagram of an example computing device 610 that may optionally be utilized to perform one or more aspects of techniques described herein. In some implementations, one or more of a client computing device, user-controlled resources engine 134, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIG. 5, as well as to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors of a first electronic device, comprising:
   detecting, at a microphone of the first electronic device, a spoken utterance provided by a user;
   detecting one or more sounds emitted by one or more additional electronic devices at the microphone, wherein each of the one or more sounds encodes a timestamp corresponding to detection of the spoken utterance at a respective electronic device of the one or more additional electronic devices;
   extracting, from the one or more sounds emitted by the one or more additional electronic devices, the one or more timestamps;
   comparing the one or more timestamps to a local timestamp corresponding to detection of the spoken utterance at the first electronic device; and
   based on the comparing, causing the first electronic device to either invoke an automated assistant locally or defer to one of the additional electronic devices.

2. The method of claim 1, further comprising causing the first electronic device to emit another sound, wherein the another sound encodes the local timestamp.

3. The method of claim 1, further comprising, prior to the comparing, altering the local timestamp based on one or more contextual cues.

4. The method of claim 3, wherein the one or more contextual cues include the first electronic device being assigned a different priority than the one or more additional devices.

5. The method of claim 4, wherein the first electronic device is assigned the different priority based on the first electronic device being integral with a vehicle.

6. The method of claim 4, wherein the different priority assigned to the first electronic device is lower than one or more priorities assigned to the one or more additional electronic devices that are integral with a vehicle.

7. The method of claim 3, wherein the altering comprises adding or subtracting time from the local timestamp.

8. The method of claim 1, further comprising:
   subsequent to causing the first electronic device to invoke the automated assistant locally, detecting negative feedback from the user; and
   causing the first electronic device to emit another sound, wherein the another sound causes the one of the additional electronic devices to invoke the automated assistant.

9. The method of claim 8, further comprising causing the first electronic device to defer to the one of the additional electronic devices.

10. The method of claim 8, wherein detecting the negative feedback comprises:
    detecting a follow-up spoken utterance at the microphone; and
    processing the follow-up spoken utterance to determine that the user intended that the automated assistant be invoked on one of the additional electronic devices.

11. A first electronic device comprising one or more processors and memory storing instructions that, in response to execution of the instructions by the one or more processors, cause the one or more processors to:
    detect, at a microphone of the first electronic device, a spoken utterance provided by a user;
    detect one or more sounds emitted by one or more additional electronic devices, wherein each of the one or more sounds encodes a timestamp corresponding to detection of the spoken utterance at a respective electronic device of the one or more additional electronic devices;
    extract, from the one or more sounds emitted by the one or more additional electronic devices, the one or more timestamps;

compare the one or more timestamps to a local timestamp corresponding to detection of the spoken utterance at the first electronic device; and based on the comparison, cause the first electronic device to either invoke an automated assistant locally or defer to one of the additional electronic devices.

12. The first electronic device of claim 11, further comprising instructions to cause the first electronic device to emit a sound that encodes the local timestamp.

13. The first electronic device of claim 11, further comprising instructions to alter the local timestamp based on one or more contextual cues.

14. The first electronic device of claim 13, wherein the one or more contextual cues include the first electronic device being assigned a different priority than the one or more additional devices.

15. The first electronic device of claim 14, wherein the first electronic device is assigned the different priority based on the first electronic device being integral with a vehicle.

16. The first electronic device of claim 14, wherein the different priority assigned to the first electronic device is lower than one or more priorities assigned to the one or more additional electronic devices that are integral with a vehicle.

17. The first electronic device of claim 13, wherein the altering comprises adding or subtracting time from the local timestamp.

18. The first electronic device of claim 11, further comprising instructions to:
subsequent to invocation of the automated assistant locally at the first electronic device, detect negative feedback from the user; and cause the first electronic device to emit another sound, wherein the another sound causes the one of the additional electronic devices to invoke the automated assistant.

19. The first electronic device of claim 18, further comprising instructions to cause the first electronic device to defer to the one of the additional electronic devices.

20. At least one non-transitory computer-readable medium comprising instructions that, in response to execution of the instructions by one or more processors of a first electronic device, cause the one or more processors to:
detect, at a microphone of the first electronic device, a spoken utterance provided by a user;

detect one or more sounds emitted by one or more additional electronic devices, wherein each of the one or more sounds encodes a timestamp corresponding to detection of the spoken utterance at a respective electronic device of the one or more additional electronic devices;

extract, from the one or more sounds emitted by the one or more additional electronic devices, the one or more timestamps;

compare the one or more timestamps to a local timestamp corresponding to detection of the spoken utterance at the first electronic device; and based on the comparison, cause the first electronic device to either invoke an automated assistant locally or defer to one of the additional electronic devices.

* * * * *